United States Patent
Yuan et al.

(10) Patent No.: US 12,160,387 B2
(45) Date of Patent: *Dec. 3, 2024

(54) METHOD AND DEVICES FOR UPLINK SIGNAL TRANSMITTING AND RECEIVING IN A WIRELESS COMMUNICATION SYSTEM

(71) Applicant: NEC Corporation, Tokyo (JP)

(72) Inventors: Fang Yuan, Beijing (CN); Gang Wang, Beijing (CN)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,485

(22) Filed: Feb. 3, 2023

(65) Prior Publication Data

US 2023/0188298 A1    Jun. 15, 2023

Related U.S. Application Data

(63) Continuation of application No. 16/959,817, filed as application No. PCT/CN2018/071604 on Jan. 5, 2018, now Pat. No. 11,575,485.

(51) Int. Cl.
*H04W 72/21* (2023.01)
*H04L 5/00* (2006.01)

(52) U.S. Cl.
CPC .......... *H04L 5/0053* (2013.01); *H04L 5/0005* (2013.01); *H04W 72/21* (2023.01)

(58) Field of Classification Search
CPC ...... H04W 72/21; H04L 5/0005; H04L 12/28; H04L 12/50

(Continued)

(56) References Cited

U.S. PATENT DOCUMENTS 11,609,877 B1 * 3/2023 Haidar ............... G06F 1/04
2013/0064217 A1   3/2013 Khan et al.
(Continued)

FOREIGN PATENT DOCUMENTS

CN    103477699 A    12/2013
CN    103561475 A    2/2014
(Continued)

OTHER PUBLICATIONS

International Search Report for PCT/CN2018/071604 dated Sep. 25, 2018 (PCT/ISA/210).
(Continued)

*Primary Examiner* — Dang T Ton
(74) *Attorney, Agent, or Firm* — Dickinson Wright PLLC

(57) ABSTRACT

Embodiments of the present disclosure relate to methods, devices, and computer readable medium for uplink signal transmitting and receiving. A method comprises: receiving a first downlink signal from a first transmission/reception point (TRP); receiving a second downlink signal from a second TRP; and transmitting an uplink control signal to at least one of the first and second TRPs, the uplink control signal comprising first control information associated with the first downlink signal and second control information associated with the second downlink signal, and the first control information and the second control information being included in the uplink control signal in an order determined by an identification related to reference signals associated with the first downlink signal and the second downlink signal. Embodiments of the present disclosure may avoid ambiguity in uplink control information bit ordering in uplink control signal transmission and reception.

4 Claims, 11 Drawing Sheets

(58) Field of Classification Search
USPC .................................. 370/329, 400, 401, 403
See application file for complete search history.

(56) References Cited

U.S. PATENT DOCUMENTS

| | | | |
|---|---|---|---|
| 2015/0155994 A1 | 6/2015 | Papasakellariou et al. | |
| 2019/0150183 A1 | 5/2019 | Aiba .................. | H04W 72/0446 370/336 |
| 2021/0337529 A1 | 10/2021 | Ji ...................... | H04W 72/0406 |

FOREIGN PATENT DOCUMENTS

| | | |
|---|---|---|
| CN | 103733709 A | 4/2014 |
| CN | 103812620 A | 5/2014 |
| CN | 104365045 A | 2/2015 |
| CN | 104685955 A | 6/2015 |
| CN | 107257269 A | 10/2017 |
| EP | 3121982 A1 | 1/2017 |
| EP | 3242433 A1 | 11/2017 |
| EP | 2 874 338 A1 | 5/2018 |
| EP | 3 026 838 A1 | 6/2018 |
| WO | 2014/067482 A1 | 5/2014 |
| WO | 2018/228487 A1 | 12/2018 |

OTHER PUBLICATIONS

Written Opinion for PCT/CN2018/071604 dated Sep. 25, 2018 (PCT/ISA/237).

Extended European: Search Report dated Nov. 24, 2020 from the European Patent Office in EP Application No. 18898481.9.

Japanese Office Communication for JP Application No. 2020-537222 mailed on Dec. 7, 2021 with English Translation.

MediaTek Inc., "Multi-TRP and multi-panel transmission", 3GPP TSG RAN WG1 adhoc_NR_AH_1709, R1-1716211, Sep. 18, 2017, Japan, pp. 1-4.

Huawei, HiSilicon, "Beam management for PUCCH", 3GPP TSG RAN WG1 #91, R1-1719807, Nov. 27, 2017, USA.

AT&T, "Remaining details on supporting multi-TRP transmission and reception", 3GPP TSG RAN WG1 adhoc_NR_AH_1709, R1-1716165, Sep. 18, 2017, Japan, pp. 1/4-4/4.

CN Office Action for CN Application No. 201880090828.7, mailed on Oct. 27, 2022 with English Translation.

Liu Xiaolin, "Multimedia Communication over Multi-Antenna Systems", University of Science and Technology of China, A dissertation for doctor's degree, China Doctoral Dissertations Full-text Database, Oct. 15, 2013.

M. Sawahashi et al., "CSI Reference Signal Multiplexing Using Carrier Frequency Swapping for FDD High-Order MIMO SDM", 2014 IEEE 80th Vehicular Technology Conference, Dec. 4, 2014.

* cited by examiner

METHOD AND DEVICES FOR UPLINK SIGNAL TRANSMITTING AND RECEIVING IN A WIRELESS COMMUNICATION SYSTEM

This application is a Continuation of U.S. application Ser. No. 16/959,817 filed on Jul. 2, 2020, which is a National Stage Entry of PCT/CN2018/071604 filed on Jan. 5, 2018, the contents of all of which are incorporated herein by reference, in their entirety.

FIELD

Non-limiting and example embodiments of the present disclosure generally relate to a technical field of wireless communication, and specifically to methods and devices for uplink signal transmitting and receiving.

BACKGROUND

This section introduces aspects that may facilitate better understanding of the disclosure. Accordingly, the statements of this section are to be read in this light and are not to be understood as admissions about what is in the prior art or what is not in the prior art.

Currently a new fifth generation (5G) wireless communication technique is being studied in the third generation partnership project (3GPP). An access technology called New Radio (NR) is adopted in 5G communication systems. NR supports various communication scenarios including multi-panel (MP) transmission, in which a terminal device communicates with more than one transmission/reception points (TRPs).

Some problems related to control signaling transmission and reception in NR are still open.

SUMMARY

Various embodiments of the present disclosure mainly aim at improving uplink control signal transmission and reception.

In a first aspect of the disclosure, there is provided a method implemented at a terminal device for transmitting an uplink control signal. The method comprises: receiving a first downlink control signal from a first TRP; receiving a second downlink control signal from a second TRP; and transmitting an uplink control signal to at least one of the first and second TRPs. The uplink control signal comprises first control information associated with the first downlink control signal and second control information associated with the second downlink control signal, and the first control information and the second control information are included in the uplink control signal in an order determined by at least one of: whether the first TRP or the second TRP being a primary TRP, an identification for the first TRP and the second TRP respectively, an identification for a resource for receiving the first downlink control signal and the second downlink control signal respectively, an identification for initializing a scrambling sequence for the first downlink control signal and the second downlink control signal respectively, and an identification for initializing a scrambling sequence for a reference signal associated with the first downlink control signal and the second downlink control signal respectively.

In some embodiments, the first control information may include at least one of: a hybrid automatic repeat request (HARQ) feedback for a downlink transmission scheduled by the first downlink control signal, and a channel state information (CSI) report for the first TRP; and the second control information may include at least one of: a HARQ feedback for a downlink transmission scheduled by the second downlink control signal, and a CSI report for the second TRP.

In some embodiments, the identification for a resource for receiving the first downlink control signal and the second downlink control signal respectively may include: an identification for a control resource set associated with the first downlink control signal and the second downlink control signal respectively, or an identification for a monitoring occasion of the first downlink control signal and the second downlink control signal respectively.

In some embodiments, the identification for the first TRP and the second TRP may include: an identification included in the first downlink control signal and the second downlink control signal respectively for indicating a corresponding TRP, or a combination of a corresponding TRP and a carrier when carrier aggregation is supported; or the identification for the first TRP and the second TRP configured via a radio resource control (RRC) signaling.

In some embodiments, the first TRP is a primary TRP and the second TRP is a secondary TRP, and the first control information is positioned ahead of the second control information in a bit sequence for the uplink control signal.

In a second aspect of the disclosure, there is provided a method implemented at a terminal device for transmitting an uplink control signal. The method comprises receiving a first downlink signal from a first TRP; receiving a second downlink signal from a second TRP; and transmitting an uplink control signal to at least one of the first and second TRPs. The uplink control signal comprises first control information associated with the first downlink signal and second control information associated with the second downlink signal, and the first control information and the second control information are included in the uplink control signal in an order determined by an identification related to a reference signal (RS) associated with the first downlink signal and the second downlink signal.

In some embodiments, the identification related to a RS associated with the first downlink signal and the second downlink signal may include at least one of: an identification for initializing a scrambling sequence for a RS associated with the first downlink signal and the second downlink signal respectively; an orthogonal cover code (OCC) value for a RS associated with the first downlink signal and the second downlink signal respectively; an index for an antenna port for a RS associated with the first downlink signal and the second downlink signal respectively; and an index for a RS group associated with the first downlink signal and the second downlink signal respectively.

In some embodiments, both the first downlink signal and the second downlink signal may be a physical downlink control channel (PDCCH) signal. In some embodiments, both the first downlink signal and the second downlink signal may be a physical downlink shared channel (PDSCH) signal.

In a third aspect of the disclosure, there is provided a method implemented at a terminal device for transmitting an uplink control signal. The method comprises receiving a downlink signal for triggering a plurality of CSI reports; and transmitting an uplink control signal comprising the plurality of CSI reports associated with the received downlink signal, the plurality of CSI reports being included in the uplink control signal in an order determined by an identification related to the plurality of CSI reports.

In some embodiments, the identification related to the plurality of CSI reports may include at least one of: an identification for a CSI RS resource associated with the plurality of CSI reports, an identification for a CSI RS resource set associated with the plurality of CSI reports, an identification for a synchronization signal block (SSB) resource associated with the plurality of CSI reports, an identification for a SSB resource set associated with the plurality of CSI reports, and an identification for a reporting configuration associated with the plurality of CSI reports.

In some embodiments, the identification for determining the order may be obtained from: an information field for indicating a CSI report configuration in the downlink signal, or, a bitmap for indicating resource configuration for a CSI RS in the downlink signal.

In a fourth aspect of the disclosure, there is provided a method implemented at a terminal device for transmitting an uplink control signal. The method comprises receiving a first downlink signal, the first downlink signal indicating a first resource group associated with a first TRP and a second resource group associated with a second TRP; transmitting a first uplink control signal using a resource from the first resource group; and transmitting a second uplink control signal using a resource from the second resource group.

In some embodiments, the method may further comprise: receiving a second downlink signal indicating a resource set for transmitting an uplink control signal, and the resource set comprises the first resource group and the second resource group.

In a fifth aspect of the disclosure, there is provided a method implemented at a first TRP for receiving an uplink control signal. The method comprises: transmitting a first downlink control signal to a terminal device; and receiving an uplink control signal from the terminal device, the uplink control signal comprises first control information associated with the first downlink control signal and second control information associated with a second downlink control signal from a second TRP, and the first control information and the second control information are included in the uplink control signal in an order determined by at least one of: whether the first TRP or the second TRP being a primary TRP, an identification for the first TRP and the second TRP respectively, an identification for a resource for receiving the first downlink control signal and the second downlink control signal respectively, an identification for initializing a scrambling sequence for the first downlink control signal and the second downlink control signal respectively, and an identification for initializing a scrambling sequence for a reference signal associated with the first downlink control signal and the second downlink control signal respectively.

In a sixth aspect of the disclosure, there is provided a method implemented at a first TRP for receiving an uplink control signal. The method comprises: transmitting a first downlink signal to a terminal device; and receiving an uplink control signal from the terminal device. The uplink control signal comprises first control information associated with the first downlink signal and second control information associated with a second downlink signal from a second TRP, and the first control information and the second control information are included in the uplink control signal in an order determined by an identification related to a RS associated with the first downlink signal and the second downlink signal.

In a seventh aspect of the disclosure, there is provided a method implemented at a TRP for receiving an uplink control signal. The method comprises: transmitting a downlink signal to a terminal device for triggering a plurality of CSI reports, and receiving an uplink control signal comprising the plurality of CSI reports associated with the received downlink signal. The plurality of CSI reports are included in the uplink control signal in an order determined by an identification related to the plurality of CSI reports.

In an eighth aspect of the disclosure, there is provided a method implemented at a first TRP for receiving an uplink control signal. The method comprises: transmitting a first downlink signal to a terminal device, the first downlink signal indicating a first resource group associated with the TRP and a second resource group associated with a second TRP; and receiving, from the terminal device, an uplink control signal using a resource from the first resource group.

In an ninth aspect of the disclosure, there is provided a terminal device. The terminal device comprises a processor and a memory. The memory contains instructions executable by said processor whereby said network device is operative to perform a method according to any of the first, second, third and fourth aspects of the disclosure.

In an tenth aspect of the disclosure, there is provided a network device. The network device comprises a processor and a memory. The memory contains instructions executable by said processor whereby said network device is operative to perform a method according to any of the fifth, sixth, seventh and eighth aspects of the disclosure.

In an eleventh aspect of the disclosure, there is provided a computer readable medium with a computer program stored thereon which, when executed by at least one processor of a device, causes the device to carry out the method of any of the first, second, third and fourth aspects of the disclosure.

In a twelfth aspect of the disclosure, there is provided a computer readable medium with a computer program stored thereon which, when executed by at least one processor of a device, causes the device to carry out the method of any of the fifth, sixth, seventh and eighth aspects of the disclosure.

Embodiments of the present disclosure may avoid ambiguity in uplink control information (UCI) bit ordering in uplink control signal transmission and reception.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
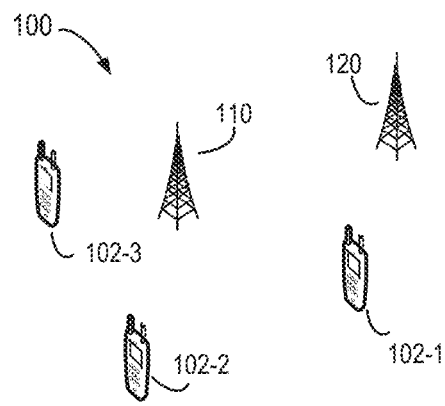
FIG. 1 illustrates an example wireless communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), LTE, NR, wireless local area network (WLAN) standards, such as the IEEE 802.11 standards, and/or any other appropriate wireless communication standard either currently known or to be developed in the future.

As used herein, the term "TRP" refers to a network device in a wireless communication network to/from which a terminal device transmits/receives data and signaling. The TRP may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting its operational status or other functions associated with its operation.

As used herein, a downlink (DL) transmission refers to a transmission from a network device to UE, and an uplink (UL) transmission refers to a transmission in an opposite direction.

FIG. 1 illustrates an example wireless communication network 100 in which embodiments of the present disclosure may be implemented. As shown, the wireless communication network 100 may include one or more TRPs, for example, TRPs 110 and 120. Each of the TRPs may be in a form of a BS, a NB, an eNB, a gNB, a virtual BS, a Base Transceiver Station (BTS), or a Base Station Subsystem (BSS), AP and the like. The TRPs, for example, TRP 110 and TRP 120, provide service to a set of UEs 102-1, 102-2, and 102-3, which is collectively referred to as "UE(s) 102".

In some embodiments, the wireless communication network 100 may be an NR access network. At Radio Access Network 1 (RAN1)-90 meeting, 3GPP has achieved the following agreements shown in Table 1 related to NR physical downlink control channel (PDCCH), NR physical downlink shared channel (PDSCH), and uplink control information (UCI).

Figure 2A:
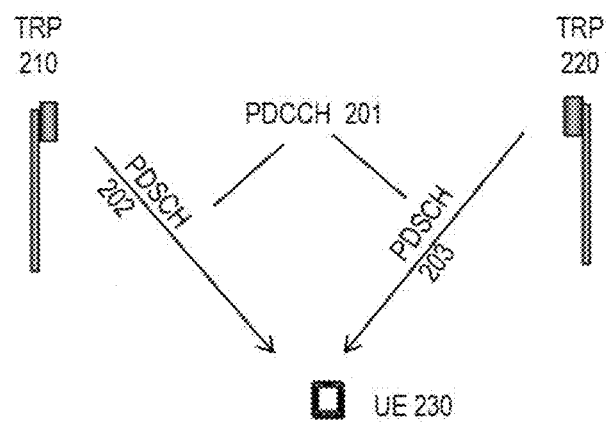
FIGS. 2A-2B show potential solutions for MP transmission in downlink.
Figure 2B:
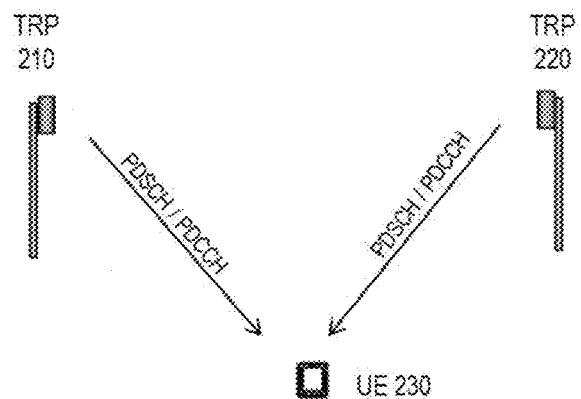

FIG. 2B, there is a separate PDCCH for scheduling PDSCH for each of the TRPs 210 and 220. The MP transmission in DL may be non-coherent joint transmission (JT), which requires less channel state information (CSI) accuracy and has relaxed requirements on backhaul and synchronization compared with a coherent JT scheme. In addition, the non-coherent JT achieves better capacity and coverage compared with a single transmission (SP) scheme, in which UE is served by a single TRP.

Figure 3A:
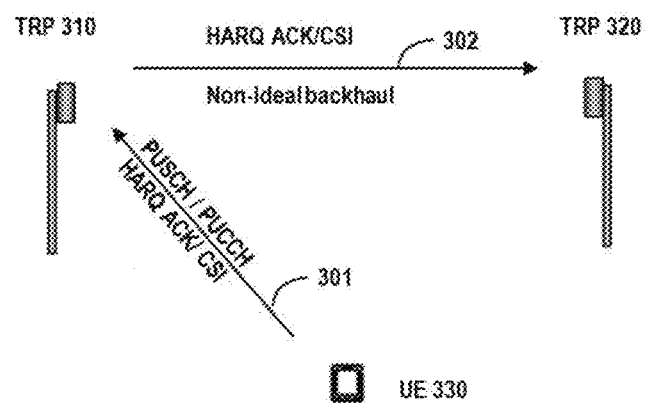
FIGS. 3A-3B show potential solutions for MP transmission in uplink.
Figure 3B:
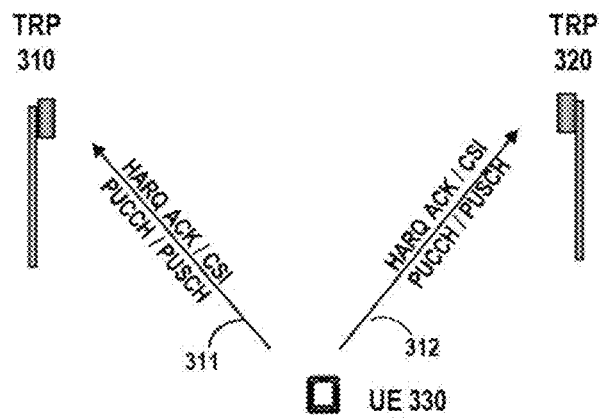

Two potential solutions for MP transmission in UL are illustrated in FIGS. 3A-3B. In a scheme shown in FIG. 3A, UE 330 transmits HARQ ACK/NACK and/or CSI report for both TRP 310 and TRP 320 via a single PUCCH or PUSCH 301. The single PUCCH or PUSCH 301 may be received by TRP 310, which then forwards the HARQ ACK/NACK and/or CSI to TRP 320 via a non-ideal backhaul 302. In a scheme shown in FIG. 3B, UE 301 transmits separate PUCCH or PUSCH (311 or 312) carrying HARQ ACK/NACK and/or CSI to each of the TRPs 310-320.

Regarding the MP transmission in UL, some open problems have been observed. For example, identical UCI (e.g., ACK/NACK or CSI) may be requested separately by each of the TRPs, and for a UL MP transmission scheme similar to that shown in FIG. 3A, how to determine an order for populating a plurality of UCI (for example two ACK/NACKs associated with DL transmissions from different TRPs) into a single PUCCH or PUSCH is still a problem to be solved. Furthermore, for a scheme similar to the one shown in FIG. 3B, how to determine resource for the separate PUCCH/PUSCH transmissions is still open.

In a carrier aggregation scenario supported in a 3GPP LTE system, a PUCCH in a primary cell is used for carrying ACK/NACK for the primary cell and one or more secondary cells. According to 3GPP LTE technical specification TS 36.212, V14.4.0, a plurality of ACK/NACKs are included in the single PUCCH in an order depending on carrier indicators included in the downlink control indicator (DCI) or cell indexes configured via a radio resource control (RRC) signaling. However, such indicators cannot be used for identifying UCI for different TRPs. Therefore, a rule for ordering the UCI bits in a PUCCH in a MP transmission scenario is needed.

TABLE 1

Agreements achieved at RAN1-90 meeting in 3 GPP

The maximum supported number of NR-PDCCHs corresponding to scheduled NR-PDSCHs that a UE can be expected to receive in a single slot is 2 on a per component carrier basis, in case of one bandwidth part (BWP) for a component carrier;
    FFS for the case of multiple BWPs for the component carrier if supported
    (Working assumption) In this case, at most 2 CWs in total are supported
    over the scheduled NR-PDSCHs
For multiple NR-PDCCH reception for scheduled NR-PDSCHs:
    FFS whether or not there is any impact on # of Hybrid Automatic Repeat
    reQuest (HARQ) processes and/or soft buffer management
    FFS the mapping between physical uplink control channel (PUCCH)
    conveying acknowledgement/negative acknowledgement (ACK/NACK)
    signalling and PDSCH In the agreements shown in Table 1, some open problems are identified, and inventors of the present invention have observed that some of the open problems should be considered in a MP transmission scenario, in which more than one TRP transmits to/receive from a single UE.

Two potential solutions for MP transmission in DL are illustrated in FIGS. 2A-2B. With the solution shown in FIG. 2A, a single PDCCH 201 (from TRP 210 or 220) is used for scheduling PDSCH transmissions 202 and 203 from TRP 210 and TRP 220 to UE 230, while in the scheme shown in In view of the above, method, devices and computer readable medium have been proposed in the present disclosure to improve uplink control signal transmission. In general, in some embodiments, a rule for ordering a plurality of UCI bits in an uplink control signal (e.g., PUCCH or PUSCH) based on explicit or implicit identification is utilized, and ambiguity in UCI bit ordering in the UL control signal for the MP transmission is avoided.

Figure 4:
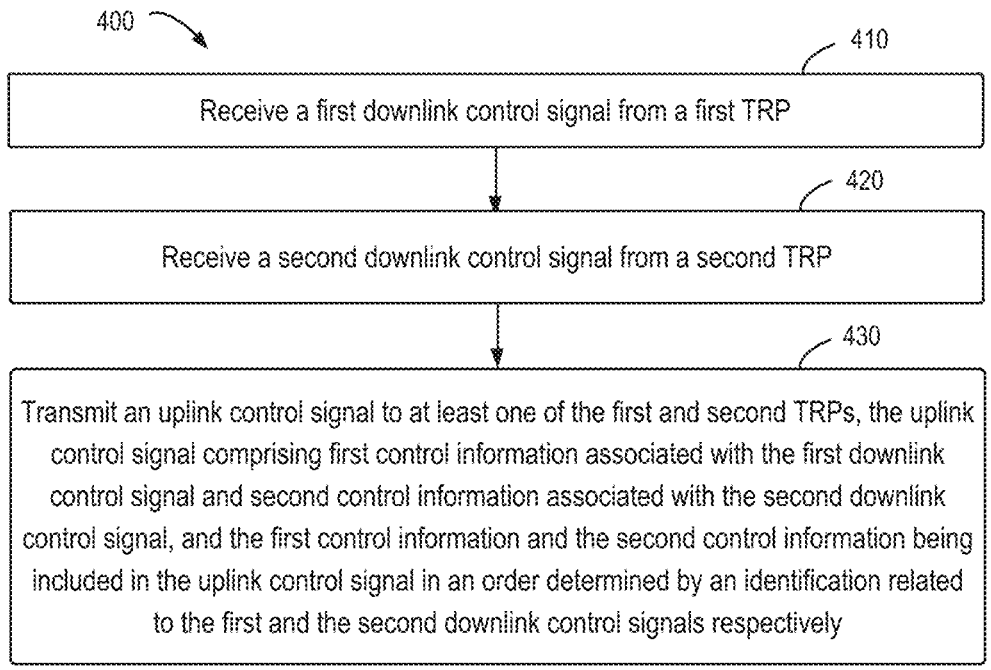
FIG. 4 shows a flow chart of a method for transmitting an uplink control signal according to an embodiment of the present disclosure.

FIG. 4 shows a flow chart of a method 400 for transmitting an uplink control signal according to an embodiment of the present disclosure. The method 400 may be implemented by, for example, a UE 102 shown in FIG. 1. For case of discussion, the method 400 will be described below with reference to UE 102 and the communication network 100 illustrated in FIG. 1. However, embodiments of the present disclosure are not limited thereto.

As shown in FIG. 4, UE 102 receives a first downlink control signal from a first TRP, e.g., TRP 110 shown in FIG. 1, at block 410, and receives a second downlink control signal from a second TRP, for example TRP 120 shown in FIG. 1, at block 420. Note that the first and second downlink control signals may or may not be received at same time. For example, the first and second downlink control signals may be received at different time slots (or subframes) or different OFDM symbols in a same time slot (or subframe).

In some embodiments, the first and second downlink control signals may include a physical downlink control channel (PDCCH) signal, however, embodiments are not limited thereto.

In some embodiments, the first downlink control signal may schedule a DL data transmission (e.g., a PDSCH transmission) from the first TRP 110 while the second downlink control signal may schedule a DL data transmission (e.g., a further PDSCH transmission) from the second TRP 120. Alternatively or in addition, in another embodiment, the first and second downlink control signals may trigger a CSI report from UE 102 for the first TRP 110 and the second TRP 120 respectively.

At block 430, UE 102 transmits an uplink control signal (for example, a PUCCH or PUSCH signal) to at least one of the TRP 110 and TRP 120. The uplink control signal comprises first control information associated with the first downlink control signal and second control information associated with the second downlink control signal. In an embodiment, the first control information may include a HARQ feedback (e.g., ACK/NACK) for a downlink transmission (e.g., a PDSCH transmission) scheduled by the first downlink control signal, and/or, a CSI report for the first TRP 110. Likewise, the second control information may include a HARQ feedback (e.g., ACK/NACK) for a downlink transmission (e.g., a PDSCH transmission) scheduled by the second downlink control signal, and/or, a CSI report for the second TRP 120.

Figure 5A:
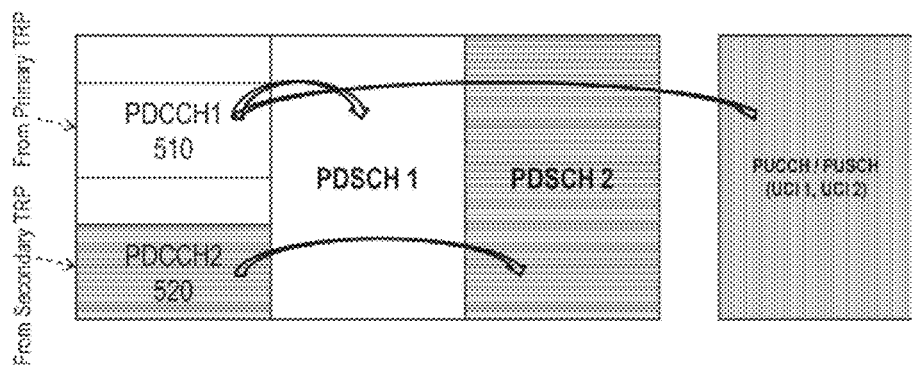
FIGS. 5A-5B show an example for the ordering of control information in an uplink control signal according to an embodiment.
Figure 5B:
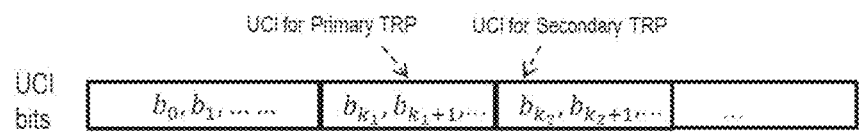

In some embodiments, the order for positioning the first control information and the second control information in the uplink control signal may be determined based on a role or configuration of the first TRP and the second TRP in the MP transmission for UE 102. For example, the order may depend on whether the first TRP or the second TRP is a primary TRP for UE 102. An example is shown in FIG. 5A. In this example, assume that the first TRP from which UE 102 receives the first downlink control signal 510 is a primary TRP, and the second TRP from which UE 102 receives the second downlink control signal 520 is a secondary TRP. Then an example for the ordering of the first control information and the second control information in this case is shown in FIG. 5B. In this example, the first control information associated with the primary TRP is positioned ahead of the second control information associated with the secondary TRP in the uplink control signal. In some embodiments, the primary TRP may be identified during initial access, and UE may access to the secondary TRP after accessing to the primary TRP. However, it should be appreciated that a different rule may be used in another embodiment. For example, the first control information associated with the primary TRP may be positioned behind the second control information associated with the secondary TRP.

In some embodiments, the first control information and the second control information may be included in the uplink control signal in an order determined by an identification related to the first and second downlink control signals received at blocks 410 and 420 by UE 102.

For example, the order for positioning the first control information and the second control information in the uplink control signal (e.g., PUCCH or PUSCH) transmitted by UE 102 at block 430 may be determined based on an ID for the first TRP and the second TRP respectively. For example, if the ID for the first TRP 110 is larger than the ID for the second TRP 120, the first control information is put ahead of the second control information in the PUCCH/PUSCH, or, vice versa.

Figure 6:
FIG. 6 shows an example of a bit sequence included in a PUCCH signal according to an embodiment.

In some embodiments, the identification for the first TRP and the second TRP may include an identification included in the first downlink control signal and the second downlink control signal respectively for indicating a corresponding TRP. For instance, if the first downlink control signal includes a smaller TRP ID1, and the second downlink control signal includes a larger TRP ID2, then the first control information may be positioned ahead of the second control information, as shown in FIG. 6.

In another embodiment, carrier aggregation may be supported for UE 102, and in this case each of the first downlink control signal and the second downlink control signal may (but not necessarily) include a jointly coded ID for indicating a combination of a TRP and a carrier. In this embodiment, the order may be determined based on the jointly coded IDs in the first downlink control signal and the second downlink control signal.

In another embodiment, the identification for the first TRP and the second TRP may include an ID for the first TRP and the second TRP, configured via a RRC signaling.

Figure 7:
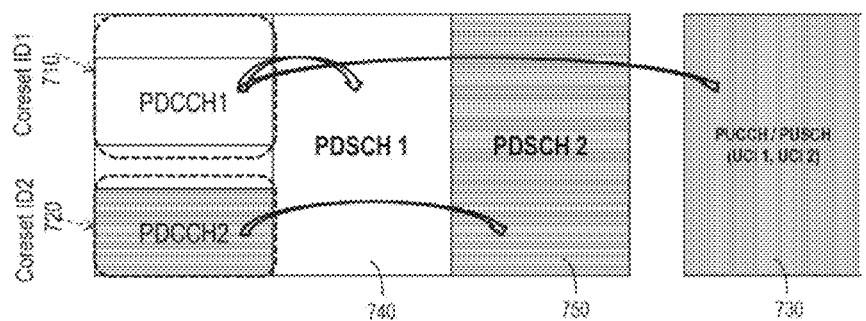
FIG. 7 shows an example for determining an order for positioning a plurality of UCI bits in a physical uplink control channel (PUCCH) according to an embodiment.
Figure 8:
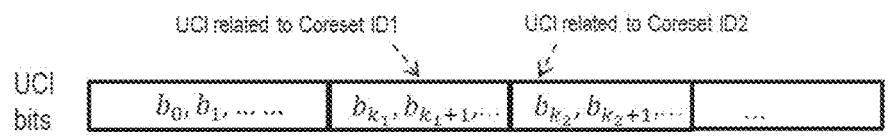
FIG. 8 shows another example of a bit sequence included in a PUCCH signal according to an embodiment.

Alternatively or in addition, the order for positioning the first control information and the second control information in the uplink control signal (e.g., PUCCH or PUSCH) may be determined based on an identification for a resource for receiving the first downlink grant and the second downlink grant respectively. In some embodiments, the identification for the resource may include an identification for a control resource set (also referred to as Coreset hereafter) associated with the first downlink control signal and the second downlink control signal respectively. FIG. 7 shows an example for determining the order for positioning a plurality of uplink control information (UCI) bits in a PUCCH/PUSCH signal according to an embodiment. In the example shown in FIG. 7, the first downlink control signal (denoted as PDCCH1 in FIG. 7) is received in a first Coreset 710, while the second downlink control signal (denoted as PDCCH2 in FIG. 7) is received in a second Coreset 720. The PUCCH/PUSCH signal 730 transmitted by the UE 102 at block 430 of FIG. 4 includes UCI 1 associated with the first downlink control signal and UCI 2 associated with the second downlink control signal. For illustration rather than limitation, the UCI 1 may include ACK/NACK for the PDSCH 740 scheduled by the first downlink control signal, and the UCI 2 may include ACK/NACK for the PDSCH 750 scheduled by the second downlink control signal. UCI 1 and UCI 2 may be positioned in the PUCCH/PUSCH in an order determined by an identification (ID) for the Coreset 710 and an ID for the Coreset 720. For example without limitation, the UCI 1 may be positioned ahead of UCI 2, if the ID1 for Coreset 710 is smaller than the ID2 for Coreset 720, or vice versa. FIG. 8 shows an example of a bit sequence included in the PUCCH/PUSCH 730. In the example, the UCI 1 related to Coreset ID1 is put ahead of the UCI 2 related to the Coreset ID 2.

The Coreset ID for determining the ordering may be obtained by the UE 102 via a RRC signaling which may be unicast and UE specific, or a broadcast signal such as a physical broadcast channel (PBCH) signal or a remaining system information (RMSI) signal.

Alternatively or in addition, in some embodiments, the identification for the resource for receiving the first downlink grant and the second downlink grant respectively may include an ID for a PDCCH monitoring occasion associated with the first downlink control signal and the second downlink control signal respectively. That is, the ID for a PDCCH monitoring occasion associated with the first downlink control signal and the second downlink control signal respectively may be used for the ordering of control information in the uplink control signal. For example, if the first downlink control signal is associated with a PDCCH monitoring occasion with an ID 1 in the first OFDM symbol in a subframe, while the second downlink control signal is associated with a PDCCH monitoring occasion with an ID larger than 1 in the third OFDM symbol in a subframe, the first control information is put ahead of the second control information in the PUCCH/PUSCH, or, vice versa, according to an ascending/descending order of the index/ID of the time resources associated with the PDCCH monitoring occasions. In another example, if the first downlink control signal is associated with a PDCCH monitoring occasion located in a frequency resource (e.g., one or more physical resource blocks or subcarriers) with a smaller index or ID (for example, 1) in a number of OFDM symbols, while the second downlink control signal is associated with a PDCCH monitoring occasion located in a frequency resource with a larger index or ID (for example, 4) in the same OFDM symbols, the first control information is put ahead of the second control information in the PUCCH/PUSCH, or, vice versa, according to an ascending/descending order of the index/ID of the frequency resources associated with the PDCCH monitoring occasions.

In still another embodiment, the order for positioning the first control information and the second control information in the PUCCH/PUSCH may be determined based on an identification for initializing a scrambling sequence for the first downlink control signal and the second downlink control signal respectively. For instance, the identification for initializing a scrambling sequence for the first downlink control signal and the second downlink control signal may include a seed for initializing a scrambling sequence for the first downlink control signal and the second downlink control signal respectively. In an embodiment, the first control information associated with the first downlink control signal with a larger initialization seed value may be positioned ahead of the second control information in the PUCCH/PUSCH signal.

In some embodiments, the identification for initializing a scrambling sequence for the first downlink control signal and the second downlink control signal may include a parameter used for generating a seed for the initializing scrambling sequence for the first downlink control signal and the second downlink control signal respectively.

In some embodiments, alternatively, an identification (for example but not limited to a seed) for initializing a scrambling sequence for a RS (for example a demodulation RS (DMRS)) associated with the first downlink control signal and the second downlink control signal respectively may be used for determining the order.

In some further embodiments, the identification for initializing a scrambling sequence for the first downlink control signal and the second downlink control signal may include a parameter used for generating the seed for the initializing scrambling sequence for a DMRS associated with the first downlink control signal and the second downlink control signal respectively.

For instance, as shown in 3GPP TS36.211 v2.0.0, the seed for initializing a scrambling sequence for an DMRS associated with the first or second downlink control signal may be obtained by:

$$c_{init}=(2^{17}(14n_s+l+1)(2N_{ID}^{nSCID}+1)+2N_{ID}^{nSCID}+n_{SCID}) \bmod 2^{31} \quad (1)$$

where $C_{init}$ represents the seed, and $n_{scid}$ and $N_{ID}^{nSCID}$ represent two parameters for generating the seed. In this example, the ordering of the first control information and the second control information in the PUCCH/PUSCH signal may be determined by an ascending (or descending) order of a value for $C_{init}$, $n_{scid}$, or $N_{ID}^{nSCID}$ in the above Equation (1).

Figure 9:
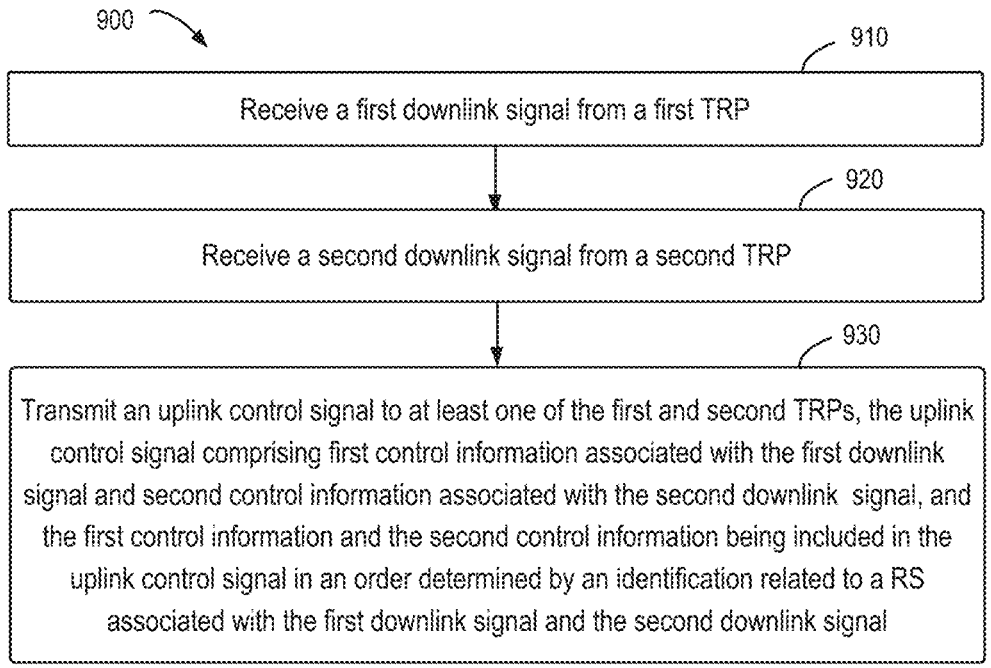
FIG. 9 shows a flow chart of another method for transmitting an uplink control signal according to an embodiment of the present disclosure.

FIG. 9 shows a flow chart of another method 900 for transmitting an uplink control signal according to an embodiment of the present disclosure. The method 900 may be implemented by, for example, a UE 102 shown in FIG. 1. For ease of discussion, the method 900 will be described below with reference to UE 102 and the communication network 100 illustrated in FIG. 1. However, embodiments of the present disclosure are not limited thereto.

As shown in FIG. 9, UE 102 receives a first downlink signal from a first TRP, for example TRP 110 shown in FIG. 1, at block 910, and receives a second downlink signal from a second TRP, for example TRP 120 shown in FIG. 1, at block 920. In an embodiment, both the first downlink signal and the second downlink signal may include a PDCCH signal. In another embodiment, both the first downlink signal and the second downlink signal may include a PDSCH signal.

At block 930, UE 102 transmits an uplink control signal, for example a PUCCH/PUSCH signal, to at least one of the first and second TRPs 110 and 120. The uplink control signal comprises first control information associated with the first downlink signal and second control information associated with the second downlink signal. In some embodiments, the first control information and the second control information may be included in the uplink control signal in an order determined by an ID related to non-colliding RSs associated with the first downlink signal and the second downlink signal. For illustration purpose, some examples for the ID related to RSs and used for determining the order are provided below; however, it should be appreciated that embodiments are not limited thereto.

In some embodiments, the order may be determined by an identification (for example a seed or a parameter for generating the seed) for initializing a scrambling sequence for an RS (e.g., DMRS) associated with the first downlink signal (e.g., PDCCH or PDSCH) and the second downlink signal (e.g., PDCCH or PDSCH) respectively. In an embodiment, the first control information associated with a larger seed value is positioned ahead of the second control information associated with a smaller seed value in a bit sequence for the PUCCH/PUSCH signal.

In another embodiment, the seed for initializing a scrambling sequence for an DMRS may be obtained by Equation (1), and the ordering of the first control information and the second control information in the PUCCH/PUSCH signal may be determined by an ascending (or descending) order of a value for $C_{init}$, $n_{scid}$, or $N_{ID}^{nSCID}$ in Equation (1).

Figure 10A:
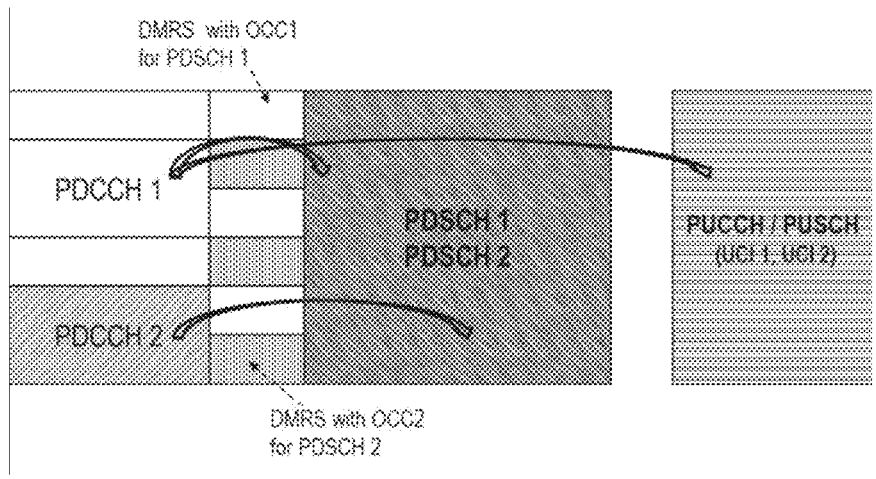
FIGS. 10A-10B show another example for the ordering of control information in an uplink control signal according to an embodiment.
Figure 10B:
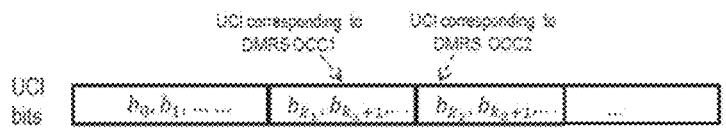

In another embodiment, the order may be determined by an OCC value and/or a cyclic shift value for an RS (e.g., DMRS) associated with each of the first downlink signal (e.g., PDCCH or PDSCH) and the second downlink signal (e.g., PDCCH or PDSCH). An example for the ordering of the first control information and the second control information based on the OCC value is shown in FIGS. 10A-10B. In this example, the DMRS for a first PDSCH signal (also referred to as PDSCH 1) received at block 910 uses a OCC value OCC1, while the DMRS for a second PDSCH signal (also referred to as PDSCH 2) received at block 920 uses a OCC value OCC2, as shown in FIG. 10A. In an embodiment, OCC1>OCC2, and in this case, the first control information associated with a larger DMRS OCC value (OCC1) is positioned ahead of the second control information associated with the a smaller DMRS OCC value (OCC2) in the uplink control signal (e.g., a PUCCH or PUSCH signal), as shown in FIG. 10B. However, it should be appreciated that a different rule may be used in another embodiment. For example, the first control information associated with OCC1 may be positioned behind the second control information associated with OCC2.

Alternatively or in addition, in some embodiments, the order may be determined by an index for an antenna port for an RS (e.g., DMRS) or an index for an RS associated with each of the first downlink signal and the second downlink signal. For example, the first control information associated with a larger DMRS antenna port number (e.g., 1004) may be positioned ahead of the second control information associated with a smaller DMRS antenna port number (e.g., 1002).

As another example, the order may be determined by an index for an RS (e.g., DMRS) group associated with the first downlink signal and the second downlink signal. In an embodiment, the first control information associated with a larger DMRS group index (e.g., 2) is positioned ahead of the second control information associated with a smaller DMRS group index (e.g., 1).

Table 7.4.1.1.2-1 and Table 7.4.1.1.2-2 in TS 38.211 V2.0.0, which are reproduced below, specify parameters for PDSCH DMRS configuration type 1 and type 2 respectively. In both Tables, the first column indicates an antenna port number p for a RS, and the second column indicates an index for a DMRS CDM group. In some embodiments, the ordering of the first control information and the second control information in the PUCCH/PUSCH signal may be determined by a value of p, a CDM group index, or a combination thereof for a corresponding DMRS associated with the first and second control information.

TABLE 7.4.1.1.2-1

Parameters for PD SCH DM-RS configuration type 1.

| p | CDM group | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 7.4.1.1.2-2

Parameters for PD SCH DM-RS configuration type 2.

| p | CDM group | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Figure 11:
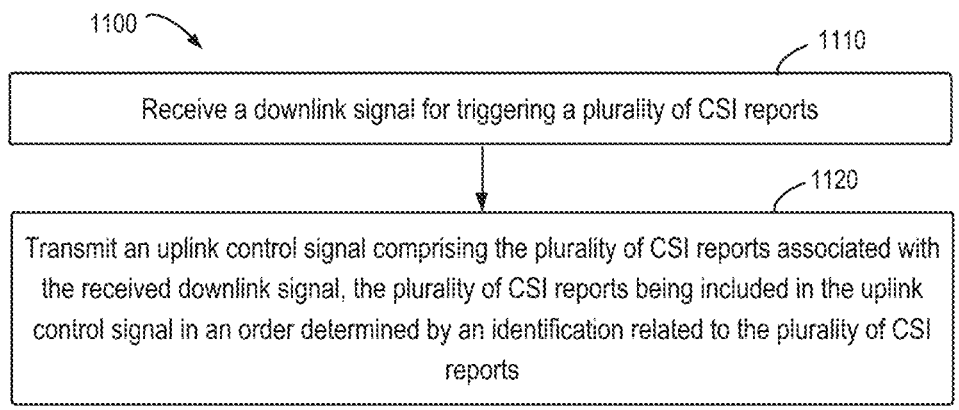
FIG. 11 shows a flow chart of another method for transmitting an uplink control signal according to an embodiment of the present disclosure.

FIG. 11 shows a flow chart of another method 1100 for transmitting an uplink control signal according to an embodiment of the present disclosure. The method 1100 may be implemented by, for example, UE 102 shown in FIG. 1. For ease of discussion, the method 1100 will be described below with reference to UE 102 and the communication network 100 illustrated in FIG. 1. However, embodiments of the present disclosure are not limited thereto.

As shown in FIG. 11, at block 1100, UE 102 receives a downlink signal for triggering a plurality of CSI reports. At block 1120, UE 102 transmits an uplink control signal (e.g., a PUCCH or PUSCH signal) comprising the plurality of CSI reports associated with the received downlink signal. In some embodiments, the plurality of CSI reports are included in the uplink control signal in an order determined by an identification related to the plurality of CSI reports. For illustration purpose, some examples for the identifications related to the plurality of CSI reports are provided below; however, it should be appreciated that embodiments are not limited thereto.

Figure 12:
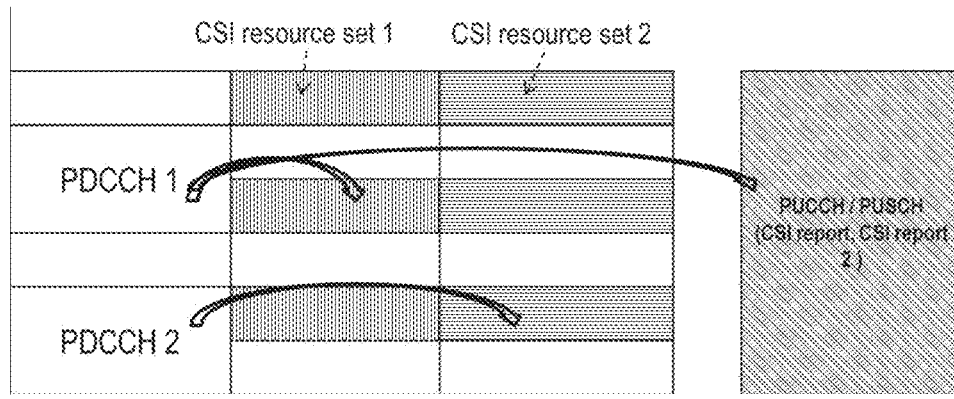
FIGS. 12-13 show examples for UCI ordering according to embodiments of the present disclosure.

In an example embodiment, the order is determined by an identification for a CSI RS resource (or resource set) associated with the plurality of CSI reports. An example is shown in FIG. 12. In this example, two CSI reports are triggered, and the first CSI report (also referred to as CSI report 1) is associated with a CSI RS resource (or resource set) with an index 1, while the second CSI report (also referred to as CSI report 2) is associated with a CSI RS resource (or resource set) with an index 2, then the first CSI report may be put ahead of the second CSI report in a PUCCH/PUSCH signal transmitted by UE 102 at block 1120, according to an ascending order of the index for the associated CSI RS resources (or resource sets).

In another embodiment, the order may be the order is determined by an identification for a synchronization signal block (SSB) resource (or resource set) associated with the plurality of CSI reports. For instance, the first CSI report may be associated with a SSB resource (or resource set) with an index 3, while the second CSI report may be associated with a SSB resource (or resource set) with an index 1. In this case, the first CSI report may be put behind the second CSI report in a PUCCH/PUSCH signal transmitted by UE 102 at block 1120, according to an ascending order of an index for the associated SSB RS resources (or resource sets).

Figure 13:
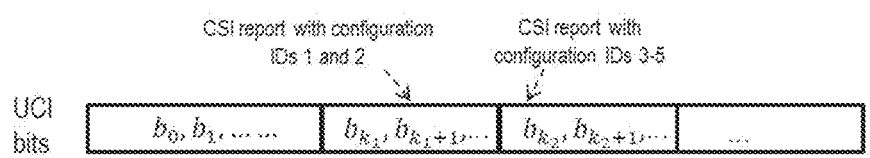

Alternatively or in addition, the ordering of the plurality of CSI reports may be determined by an ID for a reporting configuration associated with the plurality of CSI reports. For example, in a PUCCH/PUSCH signal transmitted at block 1120, a CSI report associated with a smaller reporting configuration ID (e.g., 1, 2) may be put ahead of another CSI report associated with a larger reporting configuration ID (e.g., 3, 4, 5), as shown in FIG. 13.

Figure 14:
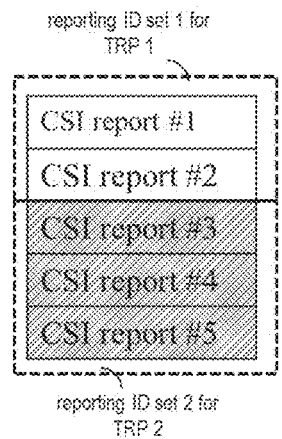
FIG. 14 shows an example for dividing reporting configuration IDs into two sets according to an embodiment of the present disclosure.

Furthermore, in some embodiments, the reporting configuration IDs may be divided into two sets, as shown in FIG. 14. For example, reporting configuration IDs less than 3 are grouped into set 1 for TRP 1, while reporting configuration IDs equal or greater than 3 are grouped into set 2 for TRP 2. In this way, UE 102 is aware of a target TRP for a CSI report based on its reporting configuration ID.

In some embodiments, the identifications related to CSI reports and used for determining the ordering of the CSI reports may be obtained from an information field for indicating a CSI report configuration in the downlink signal received by UE 102 at block 1100. For example, the identifications may be obtained from a parameter of reportTriger included in the downlink signal.

Alternatively or in addition, the identifications may be acquired by UE 102 from a bitmap indicating resource configuration for a CSI RS in the downlink signal received at block 1100. The downlink signal may include a RRC signaling or a DCI.

Figure 15:
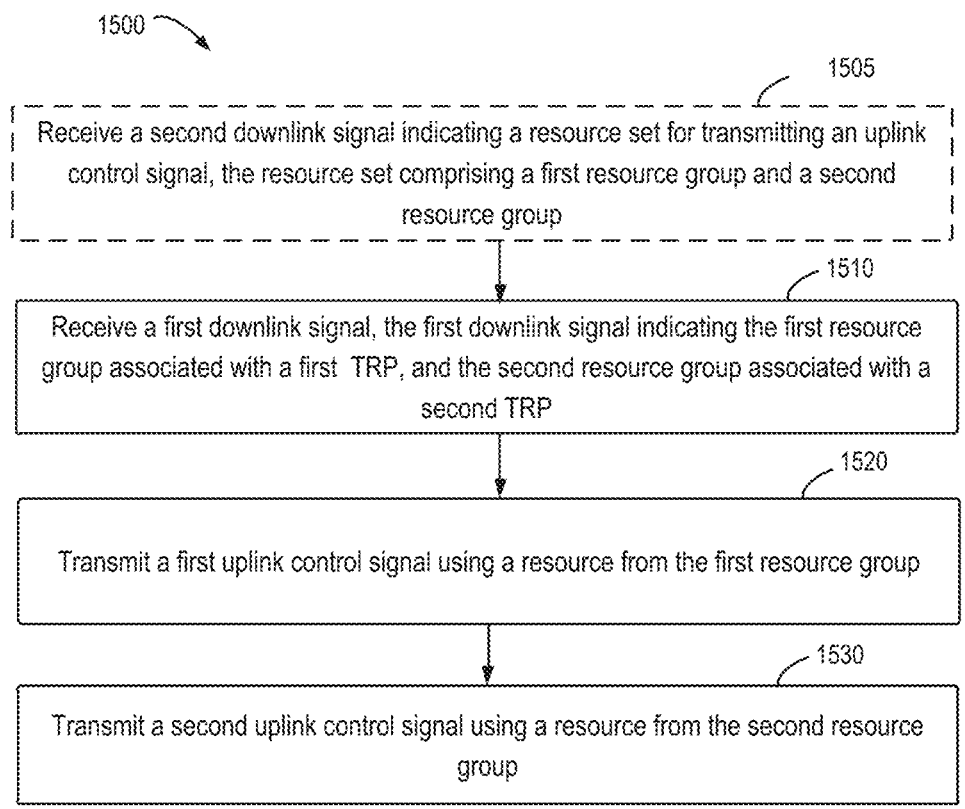
FIG. 15 shows a flow chart of another method for transmitting an uplink control signal according to an embodiment of the present disclosure.

FIG. 15 shows a flow chart of another method 1500 for transmitting an uplink control signal according to an embodiment of the present disclosure. The method 1500 may be implemented by, for example, a UE 102 shown in FIG. 1. For ease of discussion, the method 1500 will be described below with reference to UE 102 and the communication network 100 illustrated in FIG. 1. However, embodiments of the present disclosure are not limited thereto. As shown in FIG. 15, at block 1510, UE 102 receives a first downlink signal indicating a first resource group associated with a first TRP (e.g., TRP 110 shown in FIG. 1), and a second resource group associated with a second TRP (e.g., TRP 120 shown in FIG. 1). The first downlink signal may be, for example but not limited to, a PDCCH signal or a MAC-CE signal.

At block 1520, UE 102 transmits a first uplink control signal (e.g., a PUCCH or PUSCH signal) using a resource from the first resource group; and at block 1530, UE 103 transmits a second uplink control signal (e.g., a further PUCCH/PUSCH signal) using a resource from the second resource group.

Figure 16:
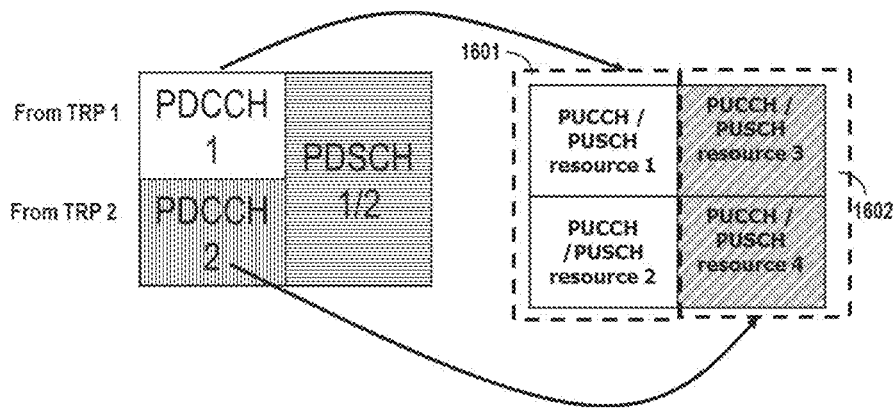
FIG. 16 shows an example for an association of a PUCCH resource group with a TRP according to an embodiment of the present disclosure.

An example for an association of a resource group with a TRP is shown in FIG. 16. In this example, UE 102 is configured a PUCCH/PUSCH resource set 1601 (i.e., the first resource group) for a PUCCH/PUSCH for the first TRP (also referred to as TRP 1), and a PUCCH/PUSCH resource set 1602 (i.e., the second resource group) for a PUCCH/PUSCH for the second TRP (also referred to as TRP 2). In this case, at block 1520, UE 102 may choose a resource from the resource set 1601 associated with the first TRP for transmitting the first uplink signal. Likewise, at block 1530, UE 102 may choose a resource from the resource set 1602 associated with the second TRP for transmitting the second uplink signal.

In an embodiment, the first downlink signal received by UE 102 at block 1510 may include a RRC signaling or a DCI, for associating one or more PUCCH/PUSCH resource sets with each TRP.

In another embodiment, a resource set may be configured for UE 102 for its PUCCH/PUSCH transmissions, and each of the TRPs is associated with a resource subset in the configured resource set. In this embodiment, the method 1500 may further comprise a block 1505, where UE 102 receives second downlink signal indicating a resource set for transmitting an uplink control signal. Then the first downlink signal received at block 1510 further indicates a resource subset (i.e., the first resource group or the second resource group) from the resource set for each TRP. That is, the resource set comprises the first resource group and the second resource group.

Figure 17:
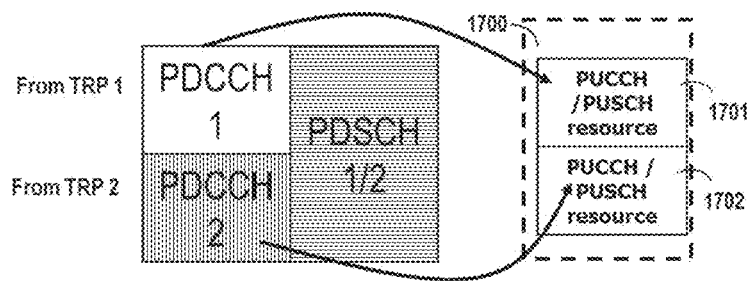
FIG. 17 illustrates an example for PUCCH resource configuration according to an embodiment of the present disclosure.

FIG. 17 illustrates an example in which a PUCCH/PUSCH resource 1701 is configured for a PUCCH/PUSCH for the first TRP, and a PUCCH/PUSCH resource 1702 is configured for a PUCCH/PUSCH for the second TRP. The PUCCH resources 1701 and 1702 included in a PUCCH/PUSCH resource set 1700 may be differentiated in a code division multiplexing (CDM), time division multiplexing (TDM) or frequency division multiplexing (FDM) manner. In other words, each resource included in the resource set 1700 which may be obtained via the second downlink signal received at block 1505 may be identified by a CDM, TDM or FDM index.

Embodiments are not limited to any specific content carried by the uplink control signals transmitted by UE 102 at block 1520. Just for illustration purpose, in some embodiment, the first and second uplink control signals transmitted at blocks 1520 and 1530 may include ACK/NACK for a PDSCH scheduled by a corresponding PDCCH. Alternatively or in addition, in another embodiment, the first and second uplink control signals may include a CSI report.

Figure 18:
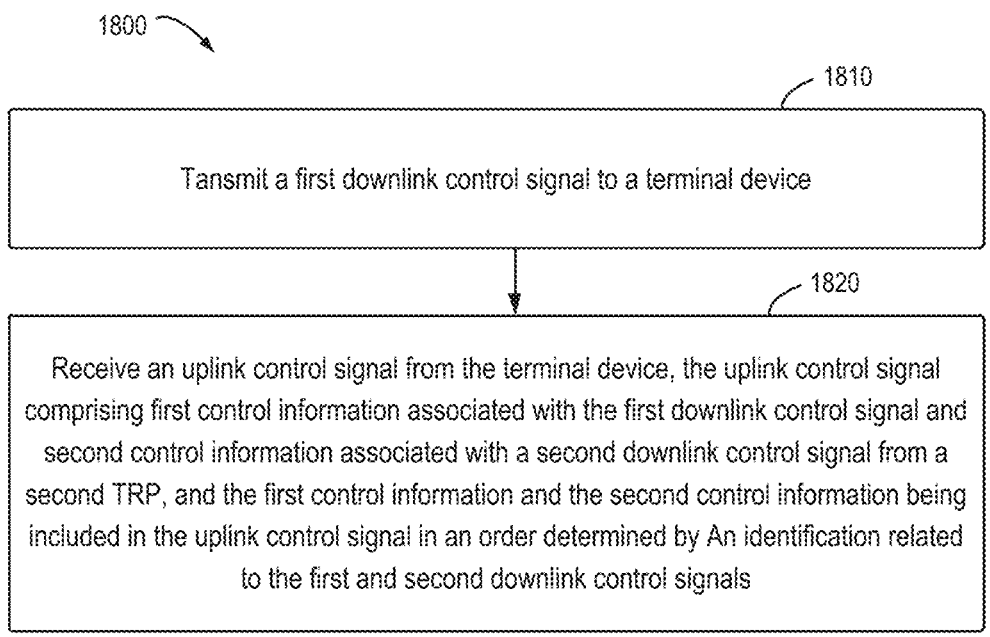
FIGS. 18-21 show flow charts of methods for receiving an uplink control signal according to embodiments of the present disclosure.

Reference is now made to FIG. 18 which shows a flow chart of a method 1800 for receiving an uplink control signal. The method 1800 may be implemented by a first TRP, for example, TRP 110 or 120 shown in FIG. 1. For case of discussion, the method 1800 will be described below with reference to TRP 110 and the communication network 100 illustrated in FIG. 1. However, embodiments of the present disclosure are not limited thereto.

As shown in FIG. 18, at block 1810, TRP 110 transmits a first downlink control signal to a terminal device, e.g., UE 102 in FIG. 1. At block 1820, TRP 110 receives an uplink control signal (e.g., a PUCCH or PUSCH signal) from UE 102. The uplink control signal comprises first control information associated with the first downlink control signal and second control information associated with a second downlink control signal from a second TRP (e.g., TRP 120 in FIG. 1). The uplink control signal may be same as that transmitted by UE 102 at block 430 of FIG. 4. Therefore, descriptions with respect to the uplink control signal and the order of control information therein provided with reference to method 400 also apply here.

As described with reference to method 400 and FIG. 4, in some embodiments, the first control information and the second control information may be included in the uplink control signal in an order determined by whether the first TRP or the second TRP is a primary TRP for UE 102. For example, the first control information and the second control information may be included in the uplink control signal in an order such that the first control information associated with a primary TRP is positioned ahead of the second control information associated with a secondary TRP. An example may be found in FIG. 5A and FIG. 5B

Alternatively or in addition, in some embodiments, the order may be determined by an identification related to the first downlink control signal and the second downlink control signal. For illustration rather than limitation, the identification related to the first downlink control signal and the second downlink control signal and used for determining the order may include an ID for the first TRP and the second TRP respectively, as described with reference to FIG. 6. In an embodiment, the ID for the first TRP and the second TRP may be an identification included in the first downlink control signal and the second downlink control signal respectively for indicating a corresponding TRP, or a combination of a corresponding TRP and a carrier if carrier aggregation is supported. In another embodiment, the ID for the first TRP and the second TRP may be configured via a RRC signaling.

In another embodiment, the order may be determined by an identification for a resource for receiving the first downlink control signal and the second downlink control signal respectively. For example, the identification for the resource for receiving the first downlink control signal and the second downlink control signal may include a Coreset ID associated with each of the first downlink control signal and the second downlink control signal, as described with reference to FIGS. 7 and 8.

Alternatively, the order may be determined by an ID for a PDCCH monitoring occasion associated with each of the first downlink control signal and the second downlink control signal, as described with reference to method 400.

In another embodiment, the first control information and the second control information may be included in the uplink control signal in an order determined by an identification (e.g., a seed or a parameter for generating the seed) for initializing a scrambling sequence for the first downlink control signal and the second downlink control signal, or an identification (e.g., a seed or a parameter for generating the seed) for initializing a scrambling sequence for a RS (e.g., DMRS) associated with the first downlink control signal and the second downlink control signal, as described with reference to method 400.

As described with reference to method 400 and FIG. 4, the first control information and the second control information carried in the uplink control signal may include, for example, ACK/NACK and/or CSI report.

Figure 19:
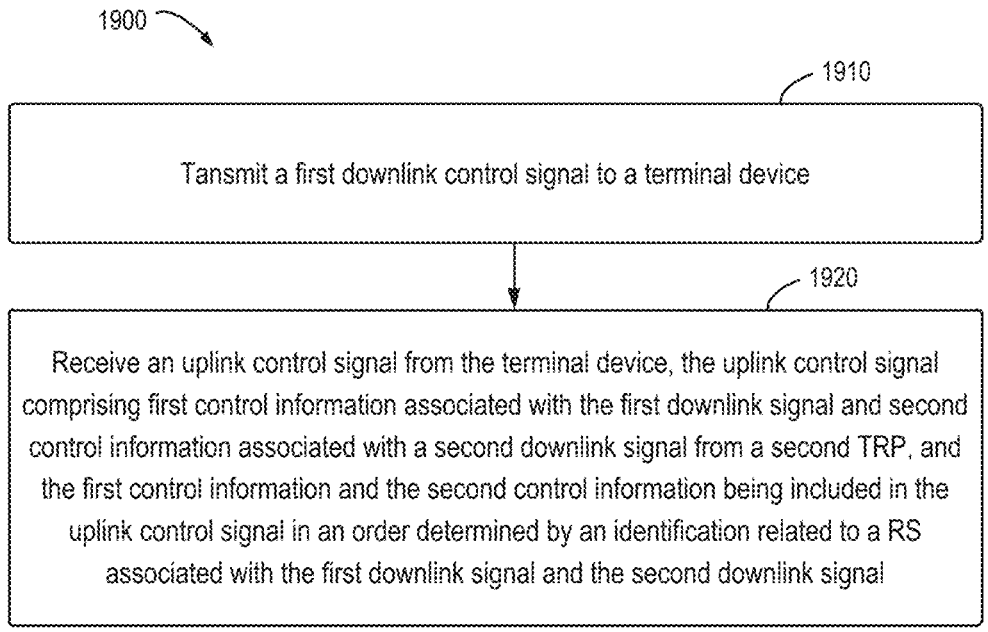

FIG. 19 shows a flow chart of another method 1900 for receiving an uplink control signal. The method 1900 may be implemented by a first TRP, for example, TRP 110 or 120 shown in FIG. 1. For case of discussion, the method 1900 will be described below with reference to TRP 110 and the communication network 100 illustrated in FIG. 1. However, embodiments of the present disclosure are not limited thereto.

As shown in FIG. 19, at block 1910, TRP 110 transmits a first downlink signal (e.g., a PDCCH or PDSCH signal) to a terminal device, e.g., UE 102 in FIG. 1. At block 1920, TRP 110 receives an uplink control signal from UE 102. The uplink signal may be same as that transmitted by UE 102 at block 930 in FIG. 9. Therefore, descriptions with respect to the uplink control signal and ordering of control information inside the uplink control signal provided with reference to FIG. 9 and method 900 also apply here, and details will not be repeated.

In some embodiments, the uplink control signal comprises first control information associated with the first downlink signal and second control information associated with a second downlink signal from a second TRP, e.g., TRP 120, and the first control information and the second control information are included in the uplink control signal in an order determined by an identification related to RS (e.g., DMRS) associated with the first downlink signal and the second downlink signal.

For illustration rather than limitation, the identification related to RS may include at least one of: an identification (e.g., a seed or a parameter for generating the seed) for initializing a scrambling sequence for a RS associated with each of the first downlink signal and the second downlink signal, an OCC or CS value for a RS associated with each of the first downlink signal and the second downlink signal; an index for an antenna port for a RS (or an index for an RS) associated with each of the first downlink signal and the second downlink signal; and an index for a RS group associated with each of the first downlink signal and the second downlink signal.

Figure 20:
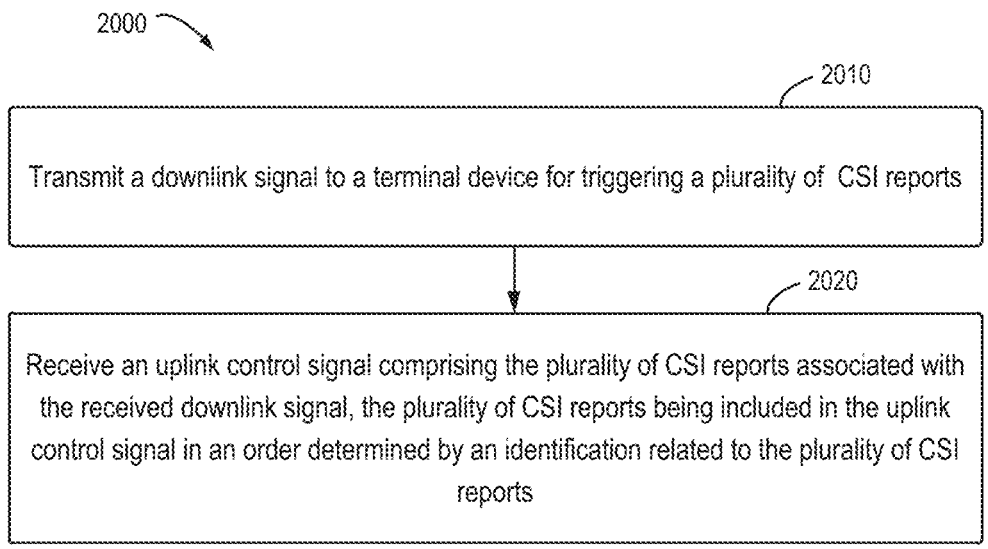

FIG. 20 shows a flow chart of another method 2000 for receiving an uplink control signal. The method 2000 may be implemented by, for example, TRP 110 or 120 shown in FIG. 1. For ease of discussion, the method 2000 will be described below with reference to TRP 110 and the communication network 100 illustrated in FIG. 1. However, embodiments of the present disclosure are not limited thereto.

As shown in FIG. 20, at block 2010, TRP 110 transmits a first downlink signal (e.g., a PDCCH or PDSCH signal) to a terminal device, e.g., UE 102 in FIG. 1, for triggering a plurality of CSI reports. At block 2020, TRP 110 receives an uplink control signal comprising the plurality of CSI reports associated with the received downlink signal. In some embodiments, the plurality of CSI reports are included in the uplink control signal in an order determined by an identification related to the plurality of CSI reports.

For instance, the identification related to the plurality of CSI reports may include at least one of: an ID for a CSI RS resource (or resource set) associated with the plurality of CSI reports, an ID for a SSB resource (or resource set) associated with the plurality of CSI reports, and an ID for a reporting configuration associated with the plurality of CSI reports.

In some embodiments, the identification for determining the order may be obtained from: an information field for indicating a CSI report configuration in the downlink signal transmitted at block 2010; or a bitmap for indicating resource configuration for a CSI RS in the downlink signal.

The uplink control signal received by TRP 110 at block 2020 may be same as that transmitted by UE 102 at block 1120 of FIG. 11, and therefore, descriptions with respect to the uplink control signal provided with reference to method 11 and FIG. 11 also apply here.

Figure 21:
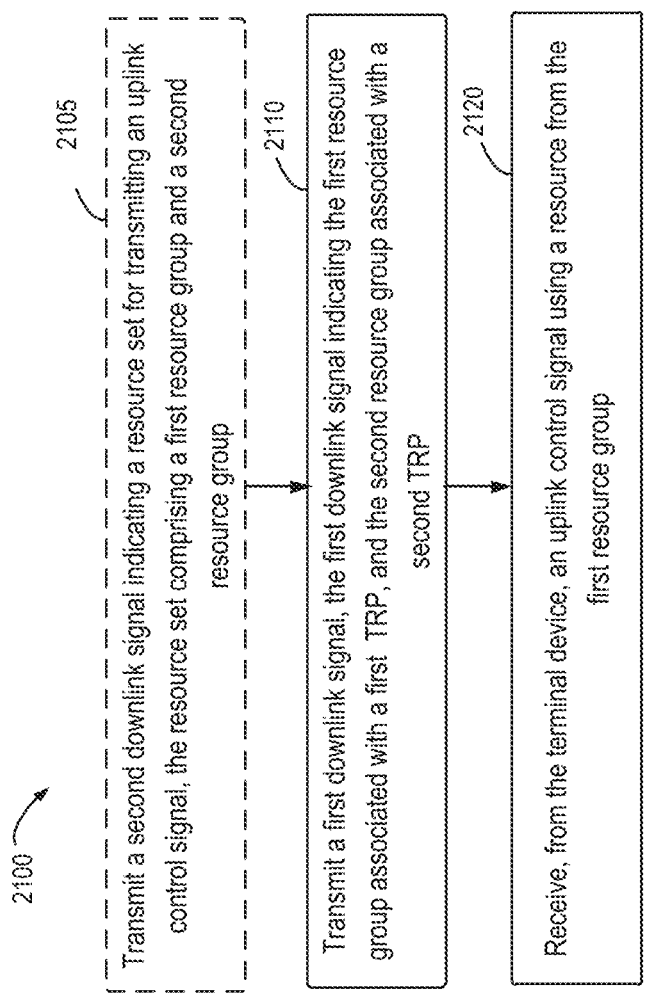

FIG. 21 shows a flow chart of another method 2100 for receiving an uplink control signal. The method 2100 may be implemented by a first TRP, for example, TRP 110 or 120 shown in FIG. 1. For ease of discussion, the method 2100 will be described below with reference to TRP 110 and the communication network 100 illustrated in FIG. 1. However, embodiments of the present disclosure are not limited thereto.

As shown in FIG. 21, at block 2110, TRP 110 transmits a first downlink signal to a terminal device, e.g., UE 102 in FIG. 1. The first downlink signal indicates a first resource group associated with TRP 110 and a second resource group associated with a second TRP 120. At block 2120, TRP 110 receives, from the UE 102, an uplink control signal using a resource from the first resource group. In an embodiment, the first resource group may be a PUCCH/PUSCH resource set configured for UE 102 for PUCCH/PUSCH transmission to TRP 110, while the second resource group may be a PUCCH/PUSCH resource set configured for UE 102 for PUCCH/PUSCH transmission to TRP 120.

Alternatively, in another embodiment, the first resource group and the second resource group may be different resource subsets from a PUCCH/PUSCH resource set configured for UE 102 for PUCCH/PUSCH transmission. In this embodiment, TRP 110 may transmit, at block 2105, a second downlink signal for indicating the resource set.

Figure 22:
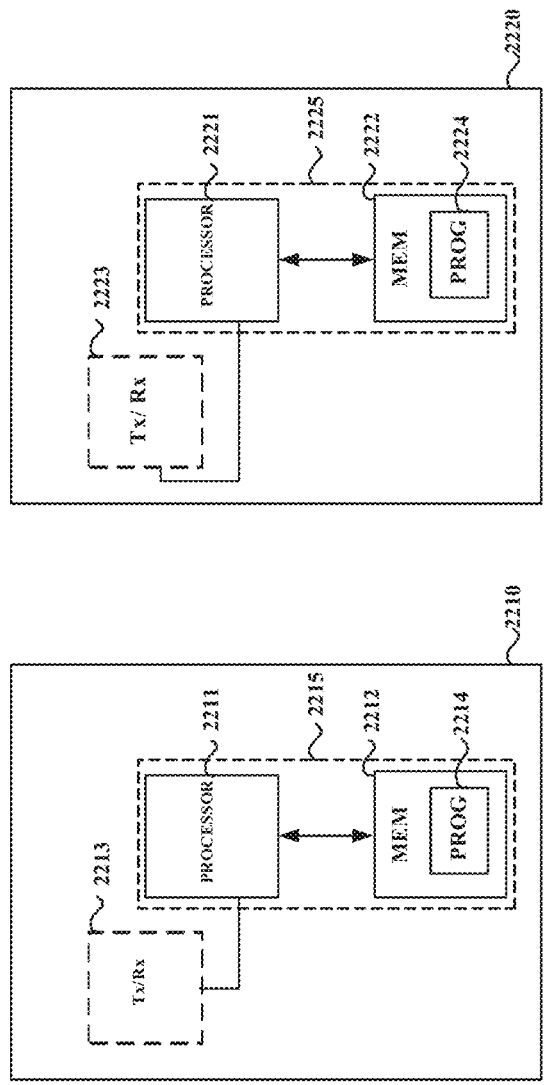
FIG. 22 illustrates a simplified block diagram of an apparatus that may be embodied as or comprised in a terminal device, and an apparatus that may be embodied as or comprised in a network device according to embodiments of the present disclosure.

FIG. 22 illustrates a simplified block diagram of an apparatus 2210 that may be embodied as or comprised in a terminal device, for example, the UE 102 shown in FIG. 1, and an apparatus 2220 that may be embodied as or comprised in a network device, for example, the TRP 110 or 120 102 shown in FIG. 1.

The apparatus 2210 comprises at least one processor 2211, such as a data processor (DP) and at least one memory (MEM) 2212 coupled to the processor 2211. The apparatus 2210 may further include a transmitter TX and receiver RX 2213 coupled to the processor 2211, which may be operable to communicatively connect to the apparatus 2220. The MEM 2212 stores a program (PROG) 2214. The PROG 2214 may include instructions that, when executed on the associated processor 2211, enable the apparatus 2210 to operate in accordance with embodiments of the present disclosure, for example method 400, 900, 1100 or 1500. A combination of the at least one processor 2211 and the at least one MEM 2212 may form processing means 2215 adapted to implement various embodiments of the present disclosure.

The apparatus 2220 comprises at least one processor 2221, such as a DP, and at least one MEM 2222 coupled to the processor 2221. The apparatus 2220 may further include a suitable TX/RX 2223 coupled to the processor 2221, which may be operable for wireless communication with the apparatus 2210. The MEM 2222 stores a PROG 2224. The PROG 2224 may include instructions that, when executed on the associated processor 2221, enable the apparatus 2220 to operate in accordance with the embodiments of the present disclosure, for example to perform any of methods 1800-2100. A combination of the at least one processor 2221 and the at least one MEM 2222 may form processing means 2225 adapted to implement various embodiments of the present disclosure.

Various embodiments of the present disclosure may be implemented by computer program executable by one or more of the processors 2211, 2221, software, firmware, hardware or in a combination thereof.

The MEMs 2212 and 2222 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2211 and 2221 may be of any type suitable to the local technical environment, and may include one or more of general purpose computers, special purpose computers, microprocessors, digital signal processors (DSPs) and processors based on multicore processor architecture, as non-limiting examples.

In addition, the present disclosure may also provide a carrier containing the computer program as mentioned above. The carrier includes computer readable storage medium which may be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

Some abbreviations used in the present disclosure and their corresponding expressions are list below:
3GPP 3rd generation partnership project
TRP Transmission/Reception Point
UE User equipment
MP Multi-pane/TRPs
PUCCH Physical Uplink Control Channel
PUSCH Physical Uplink Shared Channel
PDSCH Physical Downlink Shared Channel
PDCCH Physical Downlink Control Channel
DCI Downlink control indicator
UCI Uplink control information
NR New Radio Access.

What is claimed is:

1. A method performed by a user equipment (UE), the method comprising:
determining a position of a first ACK/NACK information in a Physical Uplink Control Channel (PUCCH) signal and a position of a second ACK/NACK information in the PUCCH signal, wherein the first ACK/NACK information in the PUCCH signal is followed by the second ACK/NACK information in the PUCCH signal in a case where a value of a first identifier for a first Control Resource Set (CORESET) is smaller than a value of a second identifier for a second CORESET; and transmitting, to a base station, the PUCCH including the first ACK/NACK information and the second ACK/NACK information.

2. The method according to claim 1, wherein the first ACK/NACK information is concatenated before the second ACK/NACK information.

3. A method performed by a base station, the method comprising:

transmitting, to a user equipment, a physical downlink shared channel (PDSCH); and receiving, from the user equipment receiving the PDSCH, a Physical Uplink Control Channel (PUCCH) including a first ACK/NACK information and a second ACK/NACK information, wherein the first ACK/NACK information in the PUCCH signal is followed by the second ACK/NACK information in the PUCCH signal in a case where a value of a first identifier for a first Control Resource Set (CORESET) is smaller than a value of a second identifier for a second CORESET.

4. The method according to claim 3, wherein the first ACK/NACK information is concatenated before the second ACK/NACK information.

* * * * *